G. C. BEIDLER.
ROLL FILM DEVELOPING APPARATUS.
APPLICATION FILED JULY 10, 1917.
1,352,109.
Patented Sept. 7, 1920.
5 SHEETS—SHEET 1.
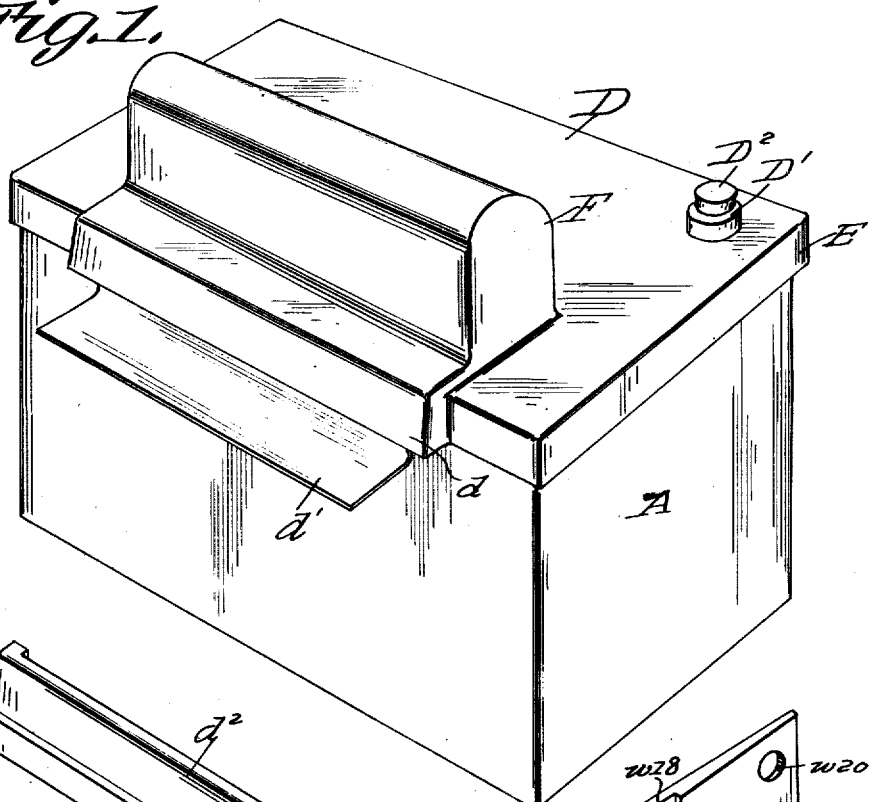
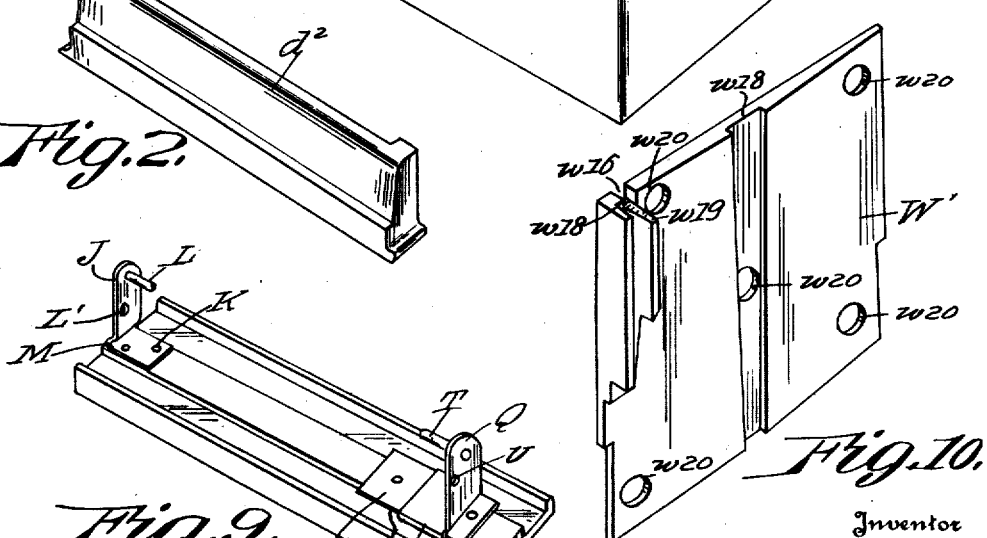
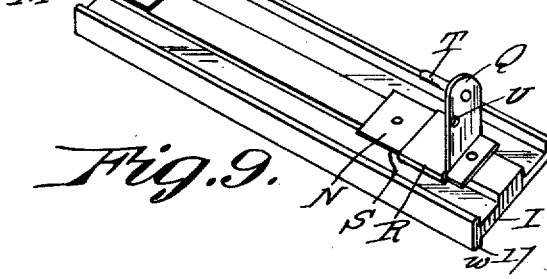
Inventor
George C Beidler
By Frank S. Ahhleman,
Attorney

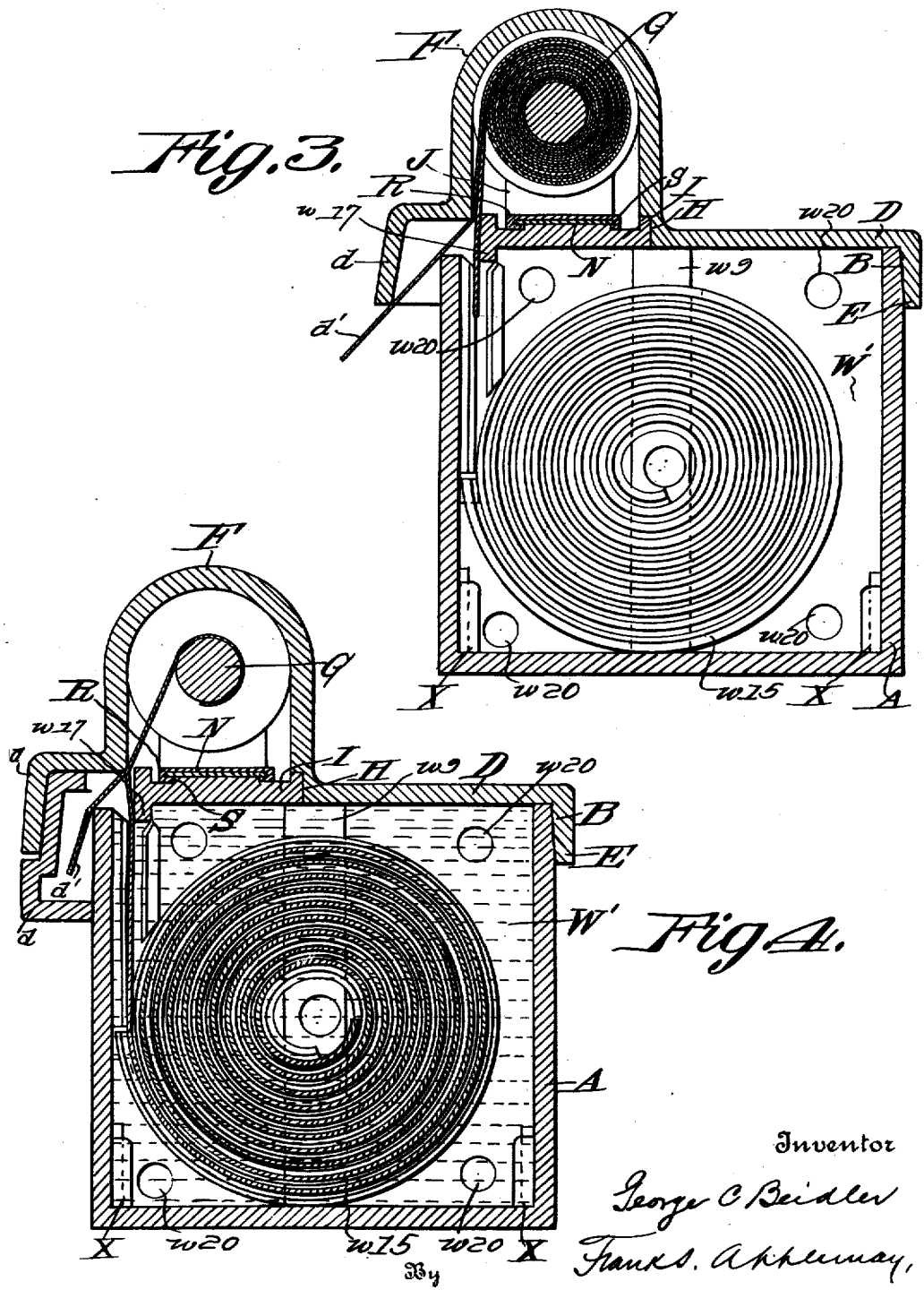

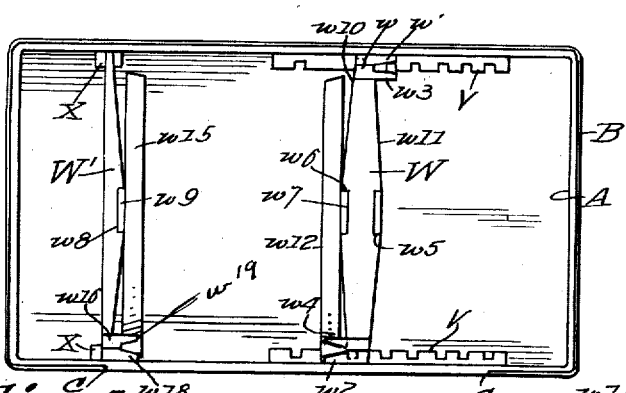
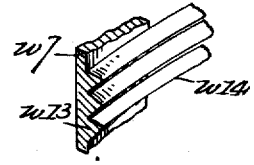
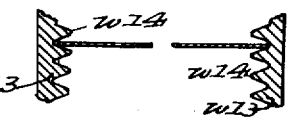
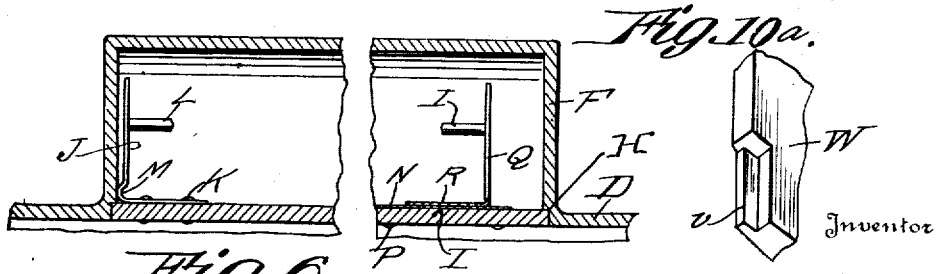

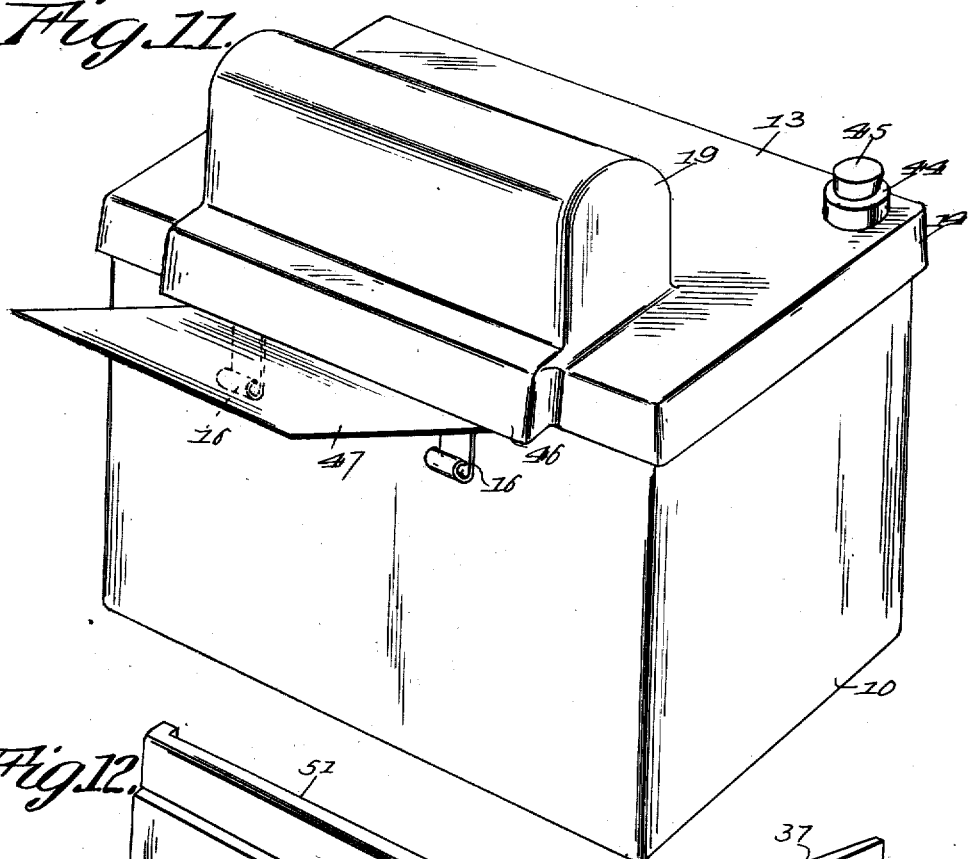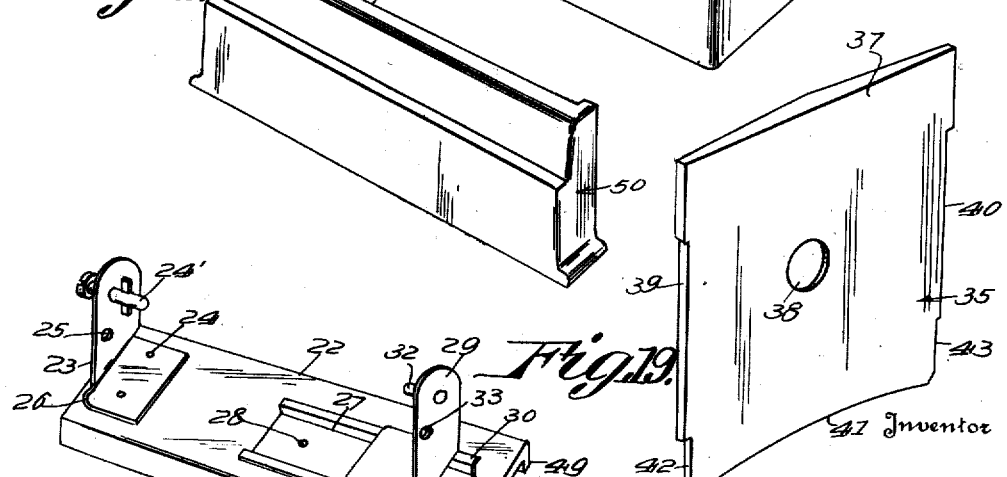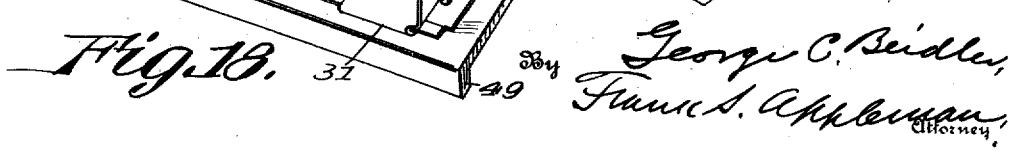

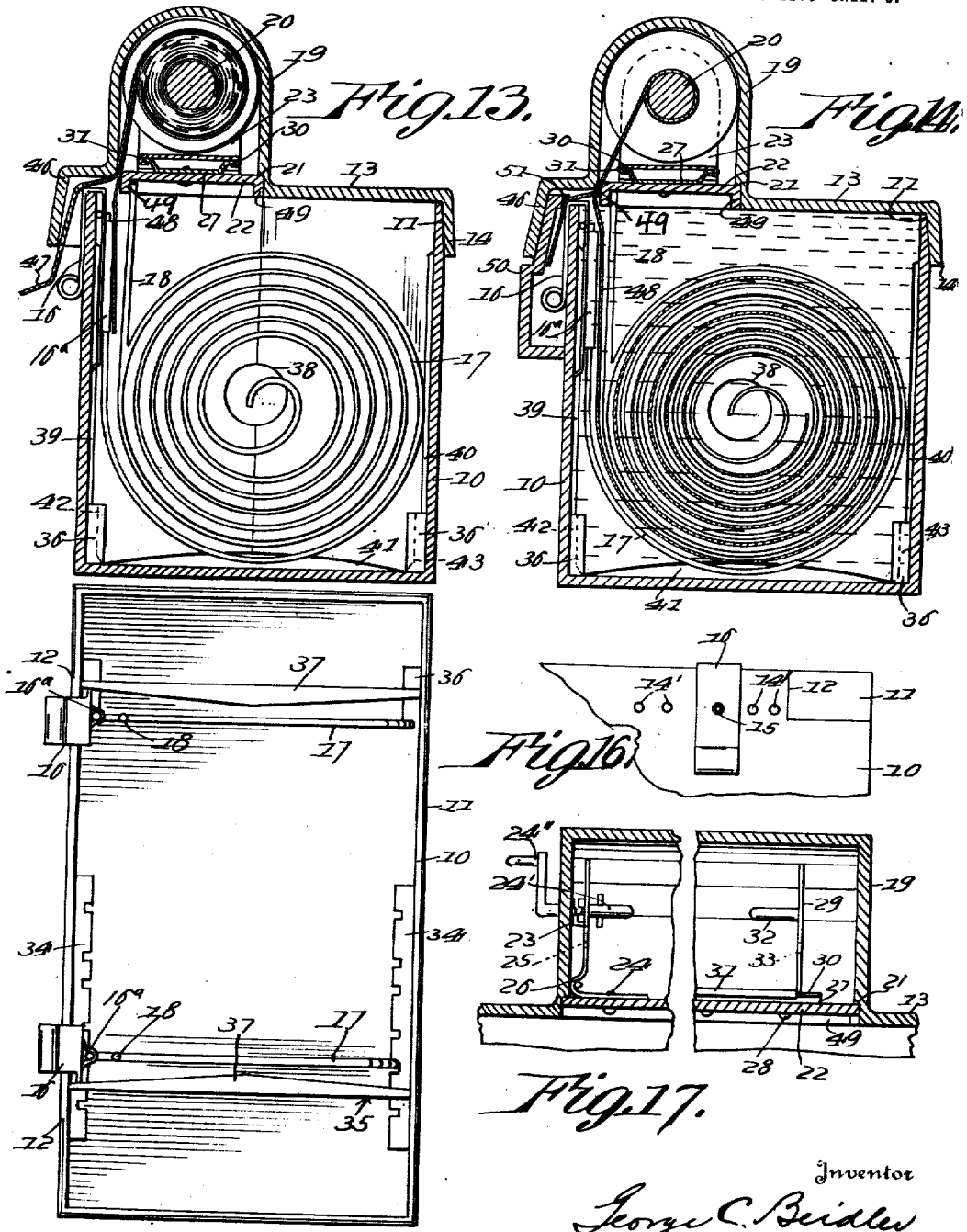

UNITED STATES PATENT OFFICE.

GEORGE C. BEIDLER, OF ROCHESTER, NEW YORK.

ROLL-FILM-DEVELOPING APPARATUS.

1,352,109.

Specification of Letters Patent.   Patented Sept. 7, 1920.

Application filed July 10, 1917. Serial No. 179,748.

*To all whom it may concern:*

Be it known that I, GEORGE C. BEIDLER, a citizen of the United States of America, and resident of Rochester, in the county of Monroe and State of New York, have invented certain new and useful Improvements in Roll-Film-Developing Apparatus, of which the following is a specification.

This invention relates to photography and particularly to means for treating film after it has been exposed to light, the said invention in part providing novel means whereby a film may be subjected to the action of fluids, either for developing or fixing or washing the same; the said invention furthermore in part consisting in a novel receptacle and a closure therefor, which will guard a film contained therein against rays of actinic light while the said film is being subjected to the action of the fluid or fluids, the said invention furthermore in part consisting of a receptacle and a cover and means for rendering the same liquid tight so that regardless of the position of the receptacle, that is to say whether it is set upright or on the ends or the sides, it will hold fluid with which the film is being treated.

A further object of this invention is to provide a support for a film spool, and the said supporting means are preferably changeable or adjustable so as to receive spools of different lengths, and it is preferable to rotatably support the said spools whereby the film may be drawn from them and delivered to a holder in the receptacle.

It is furthermore an object of the invention to provide partitions within the receptacle and, in one embodiment of the invention, to have the partitions or one of them adjustable with relation to the ends of the receptacle so that the space between the partitions may be increased or diminished and it may be desirable and in most instances will be so found, it is believed, to have the partitions movable relative to the support for the spool, and when this obtains, the distance between the two partitions may be approximately that of the length of the spool or at least the width of the film carried thereby.

A still further object and purpose of this invention is to provide for the complete submergence of the film regardless of the position of the receptacle, that is to say whether it is set in an upright position or whether it is resting on one of its sides or ends, and in the present embodiment of the invention, the cover has a chamber for the spool into which fluid will flow when the receptacle is in any other than an upright position and hence the capacity of the spaces between the walls of the receptacle and the partitions is preferably such as to hold sufficient liquid to insure that the film is covered even though a quantity of fluid does flow into the chamber of the cover of the receptacle.

A still further object and purpose of this invention is to have an opening between the cover and receptacle through which paper or other flexible film covering may be drawn while the film is being removed from the spool and is being delivered to the holder in the receptacle and furthermore to provide means for closing the opening after the paper or flexible member has been drawn from the receptacle in carrying out the manipulation or operation attending the use of the developing device and the provision of means for closing the said opening, that the joints between the cover, receptacle and closure will be light-proof as well as liquid-proof so that in the manipulation of the developing device regardless of the position of the receptacle, there will be no discharge of fluid at the joints aforesaid.

It is furthermore an object of this invention to provide for the free circulation of fluid within the receptacle from the spaces between the partitions and the ends of the receptacle and the space between the two partitions when the receptacle is turned on end, so that the fluid may flow through the partition or between the partition and the walls of the receptacle, thus causing such agitation or circulation as will wash the surfaces of the films and it has been found in practice that the fluid flowing through the apertures of the partitions and through the spaces between the partitions and the walls of the receptacle flush or contact the surface of the film with sufficient force to dislodge the deposits usually present on photographic films and freed by the action of the developing fluid during the developing process.

It is furthermore the purpose and object of the invention to associate the foregoing features with means for supporting the film in a coil between the two partitions and preferably these supporting devices are carried by the partitions so that only the surfaces of the films at or near their edges are engaged by the film supports, and the spaces between the volutions of the film are practically unobstructed and fluid is permitted to gain access to the surfaces of the film on both sides, and in the preferred construction, there is no liability of the exposed area of the film being engaged or contacted by the support or parts associated with it, and, therefore, there is no liability of injury to the coated surface but on the other hand, the development, fixing and washing fluids can gain access to the whole surface and the uniformity of action of the fluids is most pronounced.

A further object of this invention is to provide means for permitting fluid to flow transversely of the film and pass beyond the edges thereof as it insures a free circulation or current of water and permits the metallic deposits to escape from the surfaces of the film.

With the foregoing and other objects in view, the invention consists in the broad idea as well as in the details of construction to be set forth in the claims during the prosecution of the application, the said claims to be of such scope as to give protection commensurate with the inventive act in view of the state of the art when the said invention was produced.

In describing the invention in detail, reference will be had to the accompanying drawings forming part of this specification wherein like characters denote corresponding parts in the several views, and in which—

Figure 1 is a view in perspective of the exterior of the device;
Fig. 2 is a perspective view of a wedge for closing the device;

Fig. 3 is a transverse sectional view;

Fig. 4 is a transverse sectional view showing a film in the holder of the device;
Fig. 5 is a top plan view with the cover removed;

Fig. 6 illustrates a sectional view of the spool chamber and a fragment of the cover;

Fig. 7 is a perspective view of a fragment of the film holder, the same being partly in section;

Fig. 8 is a vertical sectional view of the film holder with the film applied thereto;

Fig. 9 is a perspective view of the film spool holder;

Fig. 10 is a perspective view of one of the partitions;

Fig. 10ª is a perspective view of a fragment of the movable partition;

Fig. 11 is a view in perspective of a developing device showing a modification;

Fig. 12 is a view in perspective of the closure of the space between the receptacle and its cover;

Fig. 13 is a vertical sectional view showing the interior of the receptacle with a film ready for delivery to the film holder within the receptacle;

Fig. 14 is a similar view showing the film in the holder.
Fig. 15 is a plan view of the developing device with the top removed.

Fig. 16 is a view in elevation of a fragment of the rear wall of the receptable with a fragment of a film holder support in elevation.

Fig. 17 is an enlarged sectional view of the cover and the spool support therein.

Fig. 18 is a perspective view of the spool support.
Fig. 19 is a perspective view of one of the partitions.

In these drawings A denotes a receptacle which, in the present embodiment, is shown as rectangular, the outer surface thereof being beveled at its upper edge as shown at B, the said beveled surface extending along the ends and one of the sides and along portions of the other side. The beveled portion is also extended from the right hand end of one side to a point approximately corresponding with the line C and the receptacle at the opposite end has an area approximately the same as the one just mentioned, so that a light-proof joint is possible when the cover D is applied to the receptacle, the said cover having its flange E fitting the outside of the receptacle preferably slightly flared toward its lower edge although any suitable provision may be made for rendering the joint between the body and the cover light-proof and waterproof. The cover D has an apertured boss D' for filling and emptying the receptacle and it may be closed by a stopper $D^2$.

The cover D in the present embodiment of the invention is formed with a chamber F of any appropriate configuration to produce a clearance for the reception of the spool G. The under surface may be recessed to form a shoulder H constituting a seat for the plate I, it being understood that the shoulder H is formed at the ends as well as at the sides of the housing or chamber. The plate I has a bracket J attached to it by fastenings such as K, and said bracket J has a pintle L on which one end of the spool may be mounted and it also may have an aperture L' to receive a pintle of a spool of another type and hence provision is made for the operation of these brackets in conjunction with spools of different makes. The bracket J may also be formed with a shoulder M which frictionally bears against the cover for holding the plate in place while the cover is being removed or applied to the receptacle or otherwise manipulated.

A guide-way N may also be attached to the plate I by fastenings such as P and the guide-way constitutes a support for the bracket Q and the preferred construction by which the bracket is frictionally held at different positions of adjustment on the support is to have the said bracket provided with seat flanges R which are engaged by the edges S of the guide-way N. This arrangement permits the bracket to slide on the support so that a pintle T carried by the bracket may be forced into an aperture of a spool or a pintle of a spool may be caused to enter the aperture U of the said bracket. In any event, the spool may be rotatably mounted on the bracket so that a film which it carries may be drawn from it in a manner to be presently explained.

Within the receptacle, notched bars or ribs V may be stationed and the notches of the bar on one side of the receptacle should aline with those of the bar or rib on the opposite side as it is the purpose of the inventor to apply a partition W to the notches so that the bars or ribs will hold the partition, and by reason of the existence of a plurality of notches, the partition may be placed at a point near or remote from the end wall or walls or with relation to the other partition W' and while I have shown but one rib or bar X for holding the partition W', it will be understood that a bar or rib with a plurality of notches may be used and that it would simply be a duplication of those already shown and described.

In a majority of instances during the use of a developing device made in accordance with this invention, it would perhaps be preferable to have the relation of one of the partitions fixed and to provide an adjustment of but one of them and that would be true particularly when employed in connection with a spool support in which but one bracket was made adjustable for thereby the bracket whose position is fixed could operate in conjunction with that portion of the receptacle having the fixed partition and the adjustable partition could be moved relatively to the adjustable bracket so that the space between the partitions could be regulated according to the width of the film carried by a spool to which the brackets were adjusted.

The partition W has recesses or notches $w$ on its upper edge near each of its ends for a purpose to be presently explained and it also has a right angular flange $w'$ on one end which projects from one side of the partition and a right angular flange $w^2$ at the opposite end and projecting from the opposite side of the said partition. The partition W also has a guiding rib $w^3$ spaced apart from the flange $w'$ and a guiding rib $w^4$ spaced apart from the flange $w^2$. The spaces between the flanges and ribs constitute guide-ways for film and it is the purpose of the inventor that the partition can be reversed as will presently appear for attaining an adjustment between the partitions additional to that permitted by the presence of the notched bars or ribs.

The partition W has a downwardly extending and tapered recess $w^5$ on one side and a similar recess $w^6$ on the opposite side, the said recesses being intended to engage and hold a plate $w^7$ which is movable longitudinally of the seat and is in such relation to the sides of the seat as to bind against the said edges when it is in proper position with relation to the plate.

The partition W' has a downwardly tapered seat $w^8$ which receives a plate $w^9$, the construction being such that the plate wedges in the seat.

The partition W is beveled laterally on the two sides $w^{10}$ and $w^{11}$ for a purpose to be presently explained and a coil form film holder $w^{12}$ is attached to the plate. The film holder is preferably formed of ribs or beads which taper from their bases $w^{13}$ to their outer edges $w^{14}$ and the purpose of these tapered members is to permit a film to be engaged at its edges so that it is supported without liability of the coated surface of the film coming in contact with the face of the support. In the treatment of film, it is desirable to support it so that there is no liability of the coated surface of the film contacting with the support and it is also preferable to have the spaces between the volutions of the film uninterrupted as the free passage of fluid is allowed when there are no abutments or obstructions with which the fluid can contact. The film holder extends transversely of the partition and hence there is a space between the film holder and the side of the partition where the said partition is beveled and this space constitutes a clearance for the free passage of fluid as it is agitated either by tilting the receptacle or shaking it, and it permits the escape of air from between the volutions of the film.

The plate $w^9$ carries a film holder $w^{15}$ and it is of the same construction as the film holder $w^{12}$ and need not be further described.

The partition W' has a recess $w^{16}$ in its upper edge and this recess and the recesses in the upper edges of the partitions W are intended to receive a flange $w^{17}$ on the plate I, which flange constitutes a guide for directing film to the space between a flange and guide of the partition W and between a flange $w^{18}$ and guide $w^{19}$ of the partition W'. The outer end of the film support of each partition preferably terminates under or approximately under the flange of the partition so that film traveling between the flange and guide will be directed to the spaces between the volutions of the coil, so that the said film will be coiled in the holders as it travels into the receptacle.

Each partition has apertures such as $w^{20}$ to permit fluid and air to flow through the partitions and the current of the traveling liquid is depended upon to treat the film and at the same time to carry off the freed deposits of metal used in sensitizing emulsions.

The cover D has an outwardly extending hood $d$ so that there is a clearance between the hood and the receptacle for the passage of protecting paper or other protecting flexible material $d'$ used on photographic films put up in spools, and the space between the extension and receptacle may be closed by the tapered wedge closure $d^2$ which produces a water-proof joint between the extension and the receptacle so that the liquid may not escape from the receptacle regardless of whether it is on its end or side. The wedge is tapered at its side and ends.

The partition W has a flange $v$ at its end at the bottom and the said flange fits in the notches of the bars V and the notches are so spaced apart that the partitions can be stationed at different positions with relation to the partition W' so that the film holders receive films of the usual widths now on the market or which are now commonly used, but instead of moving the partition from one notch to another, a certain limited adjustment may be attained by reversing the partition W and this movement of the partition will change the distance between the two partitions a less degree as one side of the partition extends a greater distance beyond the flange than does the other side, and so if the partition were simply reversed, the benefit of this minute adjustment can be had.

In the modified construction illustrated, 10 denotes a receptacle the outer surface of which is beveled at its upper edge as shown at 11, the said beveled surface extending along the ends and one of the sides and along portions of the other side. In Fig. 16 the beveled portion extends from the right hand edge to a point approximately corresponding with the line 12 and the receptacle at the opposite end has an area approximately the same as the one shown in Fig. 16, so that a light and leak-proof joint is possible when the cover 13 is applied to the receptacle, the said cover having its flange 14 which fits on the outside of the receptacle preferably slightly flared toward its lower edge, although any suitable provision may be made for rendering the joint between the cover and the body light-proof and water-tight, as in the form heretofore described.

One wall of the receptacle, that is to say, the wall having the interrupted beveled surfaces is preferably provided with a series of recesses 14' forming seats for a spur or lug 15 on a sliding member 16, the said sliding member embracing the edge of the receptacle and being adapted to move so as to be temporarily held with relation to any one of the notches or recesses 14'. Two of these sliding members 16 are provided and they constitute carriers or supports for the film holders 17, each of which film holders is of coiled formation with the volutions of the coil in spaced relation to the adjacent coil so that there is a clearance between them for the reception of film which is drawn from the spool and forced into the spaces between the volutions of the coil. Each of the film holders has a guide 18 connected to one of the volutions of the coil and the guide extends upwardly into position to engage film and guide it to the holder.

The cover 13, in the present embodiment of the invention, is formed with a chamber 19 of any appropriate configuration to produce a clearance for the reception of a spool 20. The under surface of the cover may be recessed to form a shoulder 21 constituting a seat for the plate 22, it being understood that the shoulder 21 is formed at the ends as well as at the side of the housing or chamber as shown in Fig. 17. The plate 22 has a bracket 23 attached to it by fastenings such as 24 and the said bracket 23 has a spindle 24' on which one end of a spool may be mounted and it also may have an aperture 25 to receive a pintle of a spool of another type, so that provision is made for the operation of these brackets in conjunction with spools of different makes. The spindle 24' is rotatable in the bracket so that it may turn a spool to unwind the film therefrom and this spindle has connection with a crank 24" at the outer end of the housing, which crank may be connected to the spindle in any appropriate way so that it may be turned from the exterior, for the purpose stated. The brackets 23 may also be formed with a shoulder 26 which frictionally bears against the cover for holding the plate in place while the cover is being removed or applied to the receptacle or otherwise manipulated, although the said plate may be readily removed by a pull which will overcome the friction between these parts.

A guide-way 27 may be also attached to the plate 22 by fastenings such as 28 and the guideway constitutes a support for the bracket 29 and the preferred construction by which the bracket is frictionally held at different positions of adjustments on the support is to have the said guideway provided with seat flanges 30 which are engaged by the flanged edges 31 of the bracket. This arrangement permits the bracket to slide on the support so that a pintle 32 carried by the bracket may be forced into an aperture of a spool or a pintle of a spool may be caused to enter the aperture 33 of the said bracket. In any event, the spool may be rotatably mounted on the bracket so that a film which it carries may be drawn from it in a manner to be presently explained.

Within the receptacle, notched bars or ribs 34 may be stationed and the notches of the bar on one side of the receptacle should aline with those of the bar or rib on the opposite side as it is the purpose of the inventor to apply partitions 35 to the notches so that the bars or ribs will hold the partitions, and by reason of the existence of a plurality of notches, the partitions may be placed at points near or remote from the end wall or walls or with relation to each other and while I have shown but one rib or bar 36 for holding one of the partitions, it will be understood that a bar or rib with a plurality of notches may be used and that it would simply be a duplication of those already shown and described.

In a majority of instances during the use of a devoloping device made in accordance with this invention, it would perhaps be preferable to have the relation of one of the partitions fixed and to provide an adjustment of but one of them and that would be true particularly when employed in connection with a spool support in which but one bracket was made adjustable for thereby the bracket whose position is fixed could operate in conjunction with that portion of the receptacle having the fixed partition and the adjustable partition could be moved relatively to the adjustable bracket so that the space between the partitions could be regulated according to the width of the film carried by a spool to which the brackets were adjusted.

The partitions which I have selected to illustrate as modifications, comprise plates 37 and each of them may have an aperture 38 through which liquid will flow from the ends of the receptacle to the space between the partitions and, furthermore, the edges of the plate may have recesses 39, 40 and 41 which produce clearances between the edges of the plate or partition and the inner wall of the receptacle for the purpose of permitting the circulation of the fluid and the side edges of the said plate at the lower ends may be further provided with notches 42 and 43 to reduce the width of these plates where they engage in the notches of the bars or ribs.

The surfaces of the plates 37 which face each other, are preferably beveled from the center to the edges to increase the clearance between the surfaces of the plates and the ends or edges of the film and this allows the metallic deposits from the film to gravitate from the film and escape during the developing operation or while the film is being treated.

The cover 13 has an apertured boss 44 to which a stopper 45 is applied, and the said cover has a rearward extension 46 which clears the wall of the receptacle and forms a space between the cover and receptacle through which paper 47 is drawn, as the film 48 is unwound from the spool, it being understood that when it is desired to transfer film from a spool and the film holders in the receptacle, the film and protecting paper which is wound on the spools of films now in ordinary use is partially unwound until the point is reached where the film appears. The plate 22 carrying the spool supports is then applied to the cover with the spool supported in the housing of the cover and with the advancing edge of the film below the plate 22 and outside of the housing. The guides 18 preferably extend above the flange 49 of the plate 22 and hence the film is practically confined between the guide and the carriers of the film supports and as the film is unwound, it is forced into the film support with the volutions of the coiled film in spaced relation to one another so that there will be no abrasion or injury to the coated surface of the film and by reason of the spaced relations of the volutions, fluid may freely circulate from end to end and gain access to the whole surface of the film.

After the film and protecting paper has been wholly unwound from the spool, the projecting portion of the protecting paper is removed as far back as it is possible to cut or tear it under the projecting portions of the cover. Thereafter, a closure 50 is inserted between the flange of the extension 46 and the side of the receptacle, making the joint light-proof and water-tight, so that the receptacle can be moved to agitate the fluid therein for the purpose and objects indicated.

The closure 50 has a recess 51 forming a clearance for the protecting paper and for the projecting portions of the supports for the film holder, and the closure 50 is tapered toward its upper edge so that it will have a wedge action between the flange of the rearward extending portion of the cover and the surface of the side of the receptacle.

The term "film" which has been employed in this specification is used in a generic sense and is intended to include any base appropriate for carrying a sensitive emulsion or coating such as is employed in photography or arts where light affects the coating and the base or body carrying the coating is subjected to the action of fluids and comprehends not only the so-called coated celluloid or paper films, but also photographic printing papers or films as it has been found that printing papers used in photography can be developed, washed and fixed with the same facility as the now commonly used celluloid film can be treated.

When the cover is applied to the receptacle, the flanges of the plate 22 are supported on the upper edges of the partitions, but the plate is held on or in the cover when it is removed by the friction heretofore described.

In the modified embodiment of the invention, the sliding members 16 have loops 16ª by which the film holding members are connected to the sliding members.

When operating the device, the film is of course delivered to the holders in the manner heretofore described and initiatively, the receptacle preferably is supplied with developing solution or fluid, and after the device has been manipulated to develop the film, the stopper 45 may be removed and the developing fluid may be poured out of the receptacle. Thereafter, water may be delivered to the receptacle and the film may be washed, rinsed and then the fixing fluid or solution can be placed in the receptacle and the film can be subjected to the action of the fixing fluid, and that may be poured off and the water may again be placed in the receptacle for finally washing the film and this can all be accomplished without exposing the film to the light, or the sequence of treatment may be varied to suit the requirements in practice.

I claim:

1. In a device relating to photography, a receptacle and a closure therefor, members in the receptacle, means for supporting them in spaced relation to each other, coil form film holders supported by the members for holding a film in coil form with the volutions of the coil of the film in spaced relation to one another.

2. In a device relating to photography, film supporting members comprising coil form film engaging means, means for supporting the said means in spaced relation to each other so that the edges of the film travel in the spaces between the volutions of the coil members.

3. In a device relating to photography, film supporting members comprising coil form film engaging means, means for supporting the said means in spaced relation to each other so that the edges of the film travel in the spaces between the volutions of the coil members, and means for guiding the film to the said coil members.

4. In a device relating to photography, film supporting members comprising coil form film engaging means tapered from their outer edges inwardly, means for supporting the said means in spaced relation to each other so that the edges of the film travel in the spaces between the volutions of the coil members, and means for guiding the film to said coil members.

5. In a device relating to photography, a receptacle, members therein, and coil form film holders carried by the said members, said film holders tapering from their outer to their inner edges.

6. In a device relating to photography, a receptacle, members therein, coil form film holders carried by the said members, said film holders tapering from their outer to their inner edges, and means for guiding film to said holders.

7. In a device relating to photography, a receptacle, members in the said receptacle, coil form film holders on said members, said members being spaced from each other whereby the edges of the film are engaged by the film holders, a cover for the receptacle, means carried by the cover for supporting a roll of film, and means for guiding film from the roll to the holders.

8. In a device relating to photography, a receptacle, members in the said receptacle, coil form film holders on said members, said members being spaced apart whereby the edges of the film are engaged by the film holders, a cover for the receptacle, means carried by the cover for supporting a roll of film, means for guiding film from the roll to the holders, and means for effecting a light-tight joint between the cover and the receptacle.

9. In a device relating to photography, a receptacle, partitions therein, means for holding a partition in different positions of adjustment, coil form film holders in the receptacle between the partitions, and a cover for the receptacle having a light and liquid proof joint therewith.

10. In a device relating to photography, a receptacle, partitions therein, means for adjustably holding a partition in place, said partitions having apertures for the flow of liquid, coil form film holders in the receptacle between the partitions, and a cover for the receptacle having a light and liquid proof joint therewith.

11. In a device relating to photography, a receptacle, partitions therein, coil form film holders in the receptacle between the partitions, and a cover for the receptacle having a light and liquid proof joint therewith.

12. In a device relating to photography, a receptacle, partitions therein, said partitions having apertures for the flow of liquid, coil form film holders in the receptacle between the partitions, and a cover for the receptacle having a light and liquid proof joint therewith.

13. In a device relating to photography, a receptacle, a cover having a light and water proof joint therewith, said cover having an extension clearing the outer surface of the receptacle, and a member for closing the space between the extension and the said receptacle.

14. In a device relating to photography, a receptacle, a cover having a light and water proof joint therewith, said cover having an extension clearing the outer surface of the receptacle, and a member having a recess in its inner surface, said member being fitted to the space between the extension and the said receptacle for closing the said opening.

15. In a device relating to photography, a receptacle, a cover having a light and water proof joint therewith, said cover having an extension clearing the outer surface of the receptacle, and an upwardly tapered member adapted to be wedged between the extension of the cover and the said receptacle for closing the space between the extension and the said receptacle.

16. In a device relating to photography, a receptacle, a cover therefor having a chamber, a plate closing the chamber, brackets on the said plate extending into the chamber, said brackets being adapted to rotatably support a film spool, and partitions in the receptacle between which the film is delivered from the said spool.

17. In a device relating to photography, a receptacle, a cover therefor having a chamber, a plate closing the chamber, brackets on the said plate extending into the chamber, said brackets being adapted to rotatably support a film spool, partitions in the receptacle between which the film is delivered from the said spool, means for adjustably holding a bracket to receive films of different lengths, and partitions in the receptacle with means for regulating the distance between the said receptacles proportional to the width of film carried by the spool.

18. In a device relating to photography, a receptacle, partitions therein, a cover fitted to the said receptacle, said cover having a chamber formed therewith, a plate for closing the said chamber, flanges on the said plate adapted to rest on the partitions for supporting the plate, a film holder in the said receptacle, a guiding member on the said film holder having its upper end extending beyond the lower edge of the flange, a spool supporting device carried by the plate and adapted to rotatably support a spool, an extension on the cover creating a clearance between the side of the receptacle and the cover forming a way for the passage of film protecting paper unwound from the spool, and a closure for the space between the extension of the cover and the said receptacle, said closure having a recess in its inner face constituting a clearance for the protecting paper projecting from the said receptacle.

19. In a device relating to photography, a receptacle, partitions therein, a cover fitted to the said receptacle, said cover having a chamber formed therewith, a plate for closing the said chamber, flanges on the said plate adapted to rest on the partitions for supporting the plate, a film holder in said receptacle, a guiding member on the film holder having its upper end extending beyond the lower edge of the flange, a spool supporting device carried by the plate and adapted to rotatably support a spool, an extension on the cover creating a clearance between the side of the receptacle and the cover forming a way for the passage of film protecting paper unwound from the spool, and a closure comprising an upwardly tapered member for the space between the extension of the cover and the said receptacle, said closure having a recess in its inner face constituting a clearance for the protecting paper projecting from the receptacle.

20. In a device relating to photography, a receptacle, a closure having a light and water proof joint throughout the contacting portions of the closure and receptacle and having a space between the said receptacle and closure for the passage of a film protecting strip, means for closing the space against the passage of light or liquid, a film holder within the receptacle, and means for rotatably supporting a film spool, said means being in operative relation to the film holder whereby film unwound from the spool is delivered to the film holder.

21. In a device relating to photography, a receptacle, partitions therein, said partitions having apertures and recesses in their edges for permitting fluid to pass from one part of the receptacle to another, a cover having a chamber, a film spool supporting device in the chamber, and a film holding member in the receptacle between the partitions adapted to receive film from the spool, the said receptacle beyond the partitions having a capacity to supply fluid to the chamber when the receptacle is tilted for maintaining the level of the liquid in the receptacle above the edges of the films therein.

22. In a device relating to photography, a receptacle, a cover therefor with flanges embracing the said receptacle, one of the said flanges being spaced apart from the side of the receptacle to form a space for the passage of a film protecting strip and the remainder of the said flanges having a light and water proof joint with the said receptacle, and a light and water proof closure interposed between the flange and the receptacle.

23. In a device relating to photography, a receptacle, partitions therein, means for holding the partitions in different positions of adjustment, coil form film holders in the receptacle between the partitions, supports for the film holders, means for holding a support at different positions of adjustment, and a cover for the receptacle having a light and liquid proof joint therewith.

24. In a device relating to photography, a receptacle, partitions therein, means for adjustably holding the partitions in place, said partitions having apertures for the flow of liquid, coil form film holders in the receptacle between the partitions, supports for the film holders, one of which is slidable, means for holding the slidable support at different positions of adjustment, and a cover for the receptacle having a light and liquid proof joint therewith.

25. In a device relating to photography, a receptacle, partitions therein, coil form film holders in the receptacle between the partitions, supports for the film holders, one of which is slidable, means for holding the slidable support at different positions of adjustment, and a cover for the receptacle having a light and liquid proof joint therewith.

26. In a device relating to photography, a receptacle, partitions therein, said partitions having apertures for the flow of liquid, coil form film holders in the receptacle between the partitions, supports for the film holders, one of which is slidable, means for holding the slidable support at different positions of adjustment, and a cover for the receptacle having a light and liquid proof joint therewith.

27. In a device relating to photography, a receptacle, partitions therein, a cover fitted to the said receptacle, said cover having a chamber formed therewith, a plate for closing said chamber, flanges on the said plate adapted to rest on the partitions for supporting the plate, a film holder in the said receptacle, supports for the film holder, one of which is slidable, means for holding the slidable support at different positions of adjustment, a guiding member on the said film holder having its upper end extending beyond the lower edge of the flange, a spool supporting device carried by the plate and adapted to rotatably support a spool, an extension on the cover creating a clearance between the side of the receptacle and the cover forming a way for the passage of film protecting paper unwound from the spool, a closure for the space beeween the extension of the cover and the said receptacle, said closure having a recess in its inner face constituting a clearance for the protecting paper projecting from the said receptacle.

28. In a device relating to photography, a receptacle, partitions therein, a cover fitted to the said receptacle, said cover having a chamber formed therewith, a plate for closing the said chamber, flanges on the said plate adapted to rest on the partitions for supporting the plate, a film holder in the supporting the plate, a film holder in the said receptacle, supports for the film holder, one of which is slidable, means for holding the slidable support at different positions of adjustment, a guiding member on the film holder having its upper end extending beyond the lower edge of the flange, a spool supporting device carried by the plate and adapted to rotatably support a spool, an extension on the cover creating a clearance between the side of the receptacle and the cover forming a way for the passage of film protecting paper unwound from the spool, and a closure comprising an upwardly tapered member for the space between the extension of the cover and the said receptacle, said closure having a recess in its inner face constituting a clearance for the protecting paper projecting from the receptacle.

29. In a device relating to photography, a receptacle a closure having a light and water proof joint throughout the contacting portions of the closure and receptacle and having a space between the said receptacle and closure for the passage of a film protecting strip, means for closing the space against the passage of light or liquid, a film holder within the receptacle, supports for the film holders, one of which is slidable, means for holding the slidable support at different positions of adjustment, means for rotatably supporting a film spool, said means being in operative relation to the film holder whereby film unwound from the spool is delivered to the film holder.

30. In a device relating to photography, a receptacle, partitions therein, said partitions having apertures and recesses in their edges for permitting fluid to pass from one part of the receptacle to another, a cover having a chamber, a film spool supporting device in the chamber, a film holding member in the receptacle between the partitions adapted to receive film from the spool, supports for the film holding member, one of which is slidable, means for holding the slidable support at different positions of adjustment; said receptacle beyond the partitions having a capacity to supply fluid to the chamber when the receptacle is tilted for maintaining the level of the liquid in the receptacle above the edges of the films therein.

31. In a device relating to photography, a receptacle, partitions therein, means for holding a partition in different positions of adjustment, coil form film holders in the receptacle between the partitions, and a cover for the receptacle having a liquid and light proof joint therewith, said cover having an aperture for the delivery and escape of fluid.

32. In a device relating to photography, a receptacle, partitions therein, means for adjustably holding a partition in place, said partitions having apertures for the flow of liquid, coil form film holders in the receptacle between the partitions, and a cover for the receptacle having a light and liquid-proof joint therewith, said cover having an aperture for the delivery and escape of fluid.

33. In a device relating to photography, a receptacle, partitions therein, coil form film holders in the receptacle between the partitions, and a cover for the receptacle having a light and liquid-proof joint therewith, said cover having an aperture for the delivery and escape of fluid.

In testimony whereof I hereunto affix my signature this 9th day of July, 1917.

GEORGE C. BEIDLER.